(12) United States Patent
Hayase et al.

(10) Patent No.: US 7,494,747 B2
(45) Date of Patent: *Feb. 24, 2009

(54) HOLOGRAPHIC RECORDING MEDIUM

(75) Inventors: Rumiko Hayase, Yokohama (JP); Akiko Hirao, Chiba (JP); Kazuki Matsumoto, Kawasaki (JP); Takayuki Tsukamoto, Kawasaki (JP); Katsutaro Ichihara, Yokohama (JP); Urara Ichihara, legal representative, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 10/986,059

(22) Filed: Nov. 12, 2004

(65) Prior Publication Data

US 2005/0196679 A1 Sep. 8, 2005

(30) Foreign Application Priority Data

Mar. 3, 2004 (JP) ............................. 2004-059608

(51) Int. Cl.
G03H 1/02 (2006.01)

(52) U.S. Cl. .................... 430/1; 430/2; 359/3

(58) Field of Classification Search ........................ None
See application file for complete search history.

(56) References Cited

U.S. PATENT DOCUMENTS

| | | | | |
|---|---|---|---|---|
| 4,859,788 | A * | 8/1989 | Brindopke et al. | 558/398 |
| 5,702,846 | A * | 12/1997 | Sato et al. | 430/2 |
| 6,482,551 | B1 | 11/2002 | Dhar et al. | |
| 2003/0139486 | A1 * | 7/2003 | Yamada et al. | 522/71 |
| 2005/0018260 | A1 * | 1/2005 | Hirao et al. | 359/3 |
| 2006/0014081 | A1 * | 1/2006 | Hayase et al. | 430/1 |
| 2006/0115740 | A1 * | 6/2006 | Hayase et al. | 430/1 |
| 2006/0128822 | A1 * | 6/2006 | Katou et al. | 522/7 |
| 2007/0030541 | A1 * | 2/2007 | Hayase et al. | 359/3 |

FOREIGN PATENT DOCUMENTS

| | | | |
|---|---|---|---|
| JP | 07-005796 | * | 1/1995 |
| JP | 11-352303 | | 12/1999 |
| JP | 2002-080764 | | 3/2002 |
| RU | 2046392 | * | 10/1995 |
| WO | 2004/011522 | * | 2/2004 |

OTHER PUBLICATIONS machine translation of JP 2002-080764.*
Trentler et al. "Epoxy resin photopolymer composites for volume holography", Chem. Mater. vol. 12, pp. 1431-1438 (2000).*
Trentler, et al., Epoxy-photopolymer composites: thick recording media for holographic storage, Proc. SPIE 4296 pp. 259-266 (2001).*
Notification of Reasons for Rejection from the Japanese Patent Office, mailed Jul. 25, 2006, in Japanese Patent Application No. 2004-059608, and English translation thereof.
Trentler, T. J. et al., "Epoxy-Photopolymer Composites: Thick Recording Media for Holographic Data Storage", Proceeding of SPIE, vol. 4296, pp. 259-266, (2001).

* cited by examiner

*Primary Examiner*—Martin J Angebranndt
(74) *Attorney, Agent, or Firm*—Finnegan, Henderson, Farabow, Garrett & Dunner, L.L.P.

(57) ABSTRACT

Disclosed is a holographic optical recording medium, comprising a recording layer containing a three dimensionally cross-linked polymer matrix, a radically polymerizable compound, and a photo radical polymerization initiator, the three dimensionally cross-linked polymer matrix comprising a cured material of a reaction product between a diglycidyl ether and an amine, the diglycidyl ether being selected from the group consisting of 1,6-hexanediol diglycidyl ether and diethylene glycol diglycidyl ether.

20 Claims, 1 Drawing Sheet

HOLOGRAPHIC RECORDING MEDIUM

CROSS-REFERENCE TO RELATED APPLICATIONS

This application is based upon and claims the benefit of priority from prior Japanese Patent Application No. 2004-059608, filed Mar. 3, 2004, the entire contents of which are incorporated herein by reference.

BACKGROUND OF THE INVENTION

1. Field of the Invention

The present invention relates to an optical recording medium, particularly, to a holographic optical recording medium.

2. Description of the Related Art

A holographic memory that permits recording information in the form of a hologram is capable of recording a large amount of information and, thus, is attracting attention as a recording medium of the next generation. Regarding the photosensitive medium needed for holographic recording, known to the art is a composition which contains, for example, a radically polymerizable monomer, a thermoplastic binder resin, a photo radical polymerization initiator, and a sensitizing pigment as the main components. The photosensitive composition for holographic recording is formed into a film and, then, an interference light exposure is performed so as to achieve the information recording.

In the portion irradiated with light of a high intensity, the polymerization reaction of the radically polymerizable monomer proceeds, and the radically polymerizable monomer is diffused from the portion irradiated with light of a low intensity toward the portion irradiated with light of a high intensity so as to bring about a concentration gradient. In other words, a difference in the density of the radically polymerizable monomer is generated in accordance with the intensity of the interference light so as to bring about a difference in the refractive index.

Proposed in recent years are a recording medium prepared by dispersing a polymerizable monomer in a three dimensionally cross-linked polymer matrix and a recording medium prepared by dispersing an optically polymerizable monomer in an epoxy matrix. In order to form a recording layer, it is necessary for the matrix having a polymerizable monomer dispersed therein to have a reasonable hardness. However, where the matrix is excessively hard, the polymerizable monomer is incapable of migration into the matrix, resulting in failure to obtain a sufficiently large difference in the refractive index. Such being the situation, there was a limit in the recording capacity and in the refractive index modulation of the holographic recording medium. Also, the recording layer tends to be locally shrunk in accordance with the polymerization of the polymerizable monomer. In this case, it is difficult to readout accurately the recorded data.

BRIEF SUMMARY OF THE INVENTION

According to one aspect of the present invention, there is provided a holographic optical recording medium, comprising a recording layer containing a three dimensionally cross-linked polymer matrix, a radically polymerizable compound, and a photo radical polymerization initiator, the three dimensionally cross-linked polymer matrix comprising a cured material of a reaction product between a diglycidyl ether and an amine, the diglycidyl ether being selected from the group consisting of 1,6-hexanediol diglycidyl ether and diethylene glycol diglycidyl ether.

According to another aspect of the present invention, there is provided a holographic optical recording medium, comprising a recording layer containing a three dimensionally cross-linked polymer matrix, a radically polymerizable compound, and a photo radical polymerization initiator, the three dimensionally cross-linked polymer matrix having a chemical structure represented by formula (1) or (2) given below:

DETAILED DESCRIPTION OF THE INVENTION

Embodiments of the present invention will now be described.

The recording layer included in a holographic optical recording medium according to one embodiment of the present invention contains a three dimensionally cross-linked polymer matrix including a cured material of the reaction product between a specified diglycidyl ether and an amine, a radically polymerizable compound, and a photo radical poly- merization initiator. The diglycidyl ether noted above is selected from the group consisting of 1,6-hexanediol diglycidyl ether and diethylene glycol diglycidyl ether. The cured material of the reaction product between the diglycidyl ether and the amine has an appropriate hardness. To be more specific, it is possible to obtain a three dimensionally cross-linked polymer matrix having an appropriate hardness that permits a radically polymerizable compound to migrate easily within the polymer matrix.

Such being the situation, it is possible to manufacture a holographic optical recording medium excellent in sensitivity and in diffraction efficiency. In addition, since the three dimensionally cross-linked polymer matrix has an appropriate hardness, shrinkage of the recording layer is suppressed even if the radically polymerizable compound polymerizes, reducing the amount of monomer.

It has been confirmed by FT-IR, FT-Raman, NMR, GC-MAS, and element analysis that the cured material of the reaction product between the specified diglycidyl ether and the amine has a chemical structure represented by following chemical formula (1) or (2):

diethylene glycol diglycidyl ether. Where the amine is mixed in an amount smaller than 0.6 times or larger than 2 times as large as the equivalent, the resolution tends to be lowered.

The radically polymerizable compound includes a compound having an ethylenically unsaturated double bond including, for example, an unsaturated carboxylic acid, an unsaturated carboxylic acid ester, an unsaturated carboxylic acid amide, and a vinyl compound. To be more specific, the radically polymerizable compound includes, for example, acrylicacid, methylacrylate, ethylacrylate, propylacrylate, butylacrylate, isobutylacrylate, 2-ethylhexylacrylate, octylacrylate, laurylacrylate, stearylacrylate, cyclohexylacrylate, bicyclopentenylacrylate, phenylacrylate, isobornylacrylate, adamantylacrylate, methacrylicacid, methylmethacrylate, propylmethacrylate, butylmethacrylate, phenylmethacrylate, phenoxyethylacrylate, chlorophenylacrylate, adamantylmethacrylate, isobornylmethacrylate, N-methylacrylamide, N,N-dimethylacryl amide, N,N-ethylene bis-acrylamide, acryloylmorpholine, vinylpyridine, styrene, bromostyrene, tribromophenylacrylate, trichlorophenylacrylate, tribromophenylmethacrylate, trichlorophenylmethacrylate, vinyl- The amine is not particularly limited as long as the amine carries out a reaction with a diglycidyl ether selected from the group consisting of 1,6-hexanediol diglycidyl ether and diethylene glycol diglycidyl ether so as to form a reaction product that can be cured. To be more specific, the amine includes, for example, ethylenediamine, diethylenetriamine, triethylenetetraamine, tetraethylenepentaamine, pentaethylenehexaamine, hexamethylenediamine, menthenediamine, isophoronediamine, bis(4-amino-3-methyldichlohexyl)methane, bis(aminomethyl)cyclohexane, N-aminoethylpiperazine, m-xylenediamine, 1,3-diaminopropane, 1,4-diaminobutane, trimethylhexamethylenediamine, iminobispropylamine, bis(hexamethylene)triamine, 1,3,6-trisaminomethylhexane, dimethylaminopropylamine, aminoethylethanolamine, tri(methylamino)hexane, m-phenylenediamine, p-phenylenediamine, diaminodiphenylmethane, diaminodiphenylsulfone, and 3,3'-diethyl-4,4'-diaminodiphenylmethane.

An aliphatic primary amine exhibits a high curing rate and is capable of being cured at room temperature. Therefore, the aliphatic primary amine is suitably used in the embodiment of the present invention. Among the amines exemplified, it is particularly desirable to use diethylenetriamine, triethylenetetraamine, tetraethylenepentaamine, pentaethylenehexaamine, and iminobispropylamine. It is desirable to use any of these amines in a mixing amount in which the amount of NH— of the amine is 0.6 to 2 times as much as the equivalent of oxirane of 1,6-hexanediol diglycidyl ether or benzoate, 3,5-dichlorovinylbenzoate, vinylnaphthalene, vinylnaphthoate, naphtylmethacrylate, naphthylacrylate, N-phenylmethacrylamide, N-phenylacrylamide, N-vinylpyrrolidinone, N-vinylcarbazole, 1-vinylimidazole, bicyclopentenylacrylate, 1,6-hexanediol diacrylate, pentaerythritol triacrylate, pentaerythritol tetraacrylate, dipentaerythritol hexaacrylate, diethylene glycol diacrylate, polyethylene glycol diacrylate, polyethylene glycol dimethacrylate, tripropylene glycol diacrylate, propylene glycol trimethacrylate, diallyl phthalate, and triallyl trimellitate.

It is desirable for these radically polymerizable compounds to be mixed in an amount of 1 to 50% by weight based on the entire amount of the recording layer. Where the mixing amount of the radically polymerizable compound is less than 1% by weight, it is impossible to increase sufficiently the refractive index of the recording layer. On the other hand, where the mixing amount noted above exceeds 50% by weight, the volume shrinkage is increased so as to lower the resolution. It is more desirable for the mixing amount of the radically polymerizable compound to fall within a range of between 3 and 30% by weight based on the entire weight of the recording layer.

The photo radical polymerization initiator includes, for example, an imidazole derivative, an organic azide compound, titanocenes, an organic peroxide, and a thioxanthone derivative. To be more specific, the photo radical polymerization initiator includes, for example, benzyl, benzoin, benzoinethylether, benzoinisopropylether, benzoinbutylether, benzoinisobutylether, 1-hydroxycyclohexylphenylketone, benzylmethylketone, benzylethylketal, benzylmethoxyethylether, 2,2'-diethylacetophenone, 2,2'-dipropyl cetophenone, 2-hydroxy-2-methylpropiophenone, p-tert-butyltrichloroacetophenone, thioxanthone, 2-chlorothioxanthone, 3,3',4,4'-tetra(t-butylperoxycarbonyl)benzophenone, 2,4,6-tris(trichloromethyl)-1,3,5-triazine, 2-[(p-methoxyphenyl)ethylene]-4,6-bis(trichloromethyl)-1,3,5-triazine, Irgacure 149, 184, 369, 651, 784, 819, 907, 1700, 1800, and 1850 manufactured by Ciba Specialty Chemicals, di-t-butylperoxide, dicumylperoxide, t-butyl cumylperoxide, t-butylperoxy acetate, t-butylperoxyphthalate, t-butylperoxybenzoate, acetylperoxide, isobutylperoxide, decanoylperoxide, lauroylperoxide, benzoylperoxide, t-butylhydroperoxide, cumenehydroperoxide, methylethylketoneperoxide, and cyclohexanoneperoxide.

It is desirable for the photo radical polymerization initiator exemplified above to be mixed in an amount of 0.1 to 10% by weight based on the amount of the radically polymerizable compound. Where the mixing amount of the photo radical polymerization initiator is less than 0.1% by weight, it is difficult to obtain a sufficiently large change in the refractive index. On the other hand, if the mixing amount noted above exceeds 10% by weight, the light absorption tends to be rendered excessively high, with the result that the resolution is lowered. It is more desirable for the mixing amount of the photo radical polymerization initiator to fall within a range of between 0.5 and 6% by weight based on the amount of the radically polymerizable compound.

It is possible to add as required a sensitizing pigment such as cyanine, merocyanine, xanthene, coumarin, or eosine as well as a silane coupling agent and a plasticizer to the composition forming the holographic optical recording medium.

The holographic optical recording medium according to the embodiment of the present invention can be obtained by coating a substrate with a solution of the precursor of the recording medium containing the components described above, followed by achieving a three dimensional cross-linkage of the matrix polymer so as to form the recording layer. The substrate includes, for example, a glass substrate and a plastic substrate, and the coating can be performed by employing the casting or a spin coating method. It is also possible to arrange two glass substrates in a manner to face each other with a spacer made of a resin interposed therebetween, followed by pouring a solution of the precursor of the recording layer into the clearance between the two glass substrates. The three dimensional cross-linking reaction of the matrix polymer proceeds even under room temperature. However, where the matrix polymer is heated to about 30 to 80° C., it is possible to promote the cross-linking reaction. It is desirable for the thickness of the recording layer to fall within a range of between 20 µm and 2 mm. Where the thickness of the recording layer is smaller than 20 µm, it is difficult to secure a sufficiently large recording capacity. On the other hand, if the thickness noted above exceeds 2 mm, the resolution tends to be lowered. It is more desirable for the thickness of the recording layer to fall within a range of between 50 µm and 1 mm.

The solution of the precursor of the recording layer, which is used for the coating, can be obtained by mixing, for example, a polymer matrix precursor solution with a monomer solution. The polymer matrix precursor solution can be obtained by mixing a diglycidyl ether and an amine. On the other hand, the monomer solution noted above can be obtained by mixing a radically polymerizable compound with a photo radical polymerization initiator. Alternatively, the solution of the precursor of the recording layer can be prepared by forming in advance a uniform solution by mixing in advance the components of the precursor noted above other than the amine, followed by adding the amine to the uniform solution thus prepared. The solution of the precursor of the recording layer can also be prepared by adding a radically polymerizable compound or a photo radical polymerization initiator to a polymer matrix precursor solution without preparing the monomer solution.

In the holographic optical recording medium according to the embodiment of the present invention, the holographic optical recording-readout can be performed by allowing an information light and a reference light to interfere with each other inside the recording layer. It is possible for the recorded hologram (holography) to be either a transmission type hologram (transmission type holography) or a reflection type hologram (reflection type holography). The interference between the information light and the reference light can be performed by an interference method in which the interference is performed between two light fluxes or by a coaxial interference method.

Figures 1, 2:
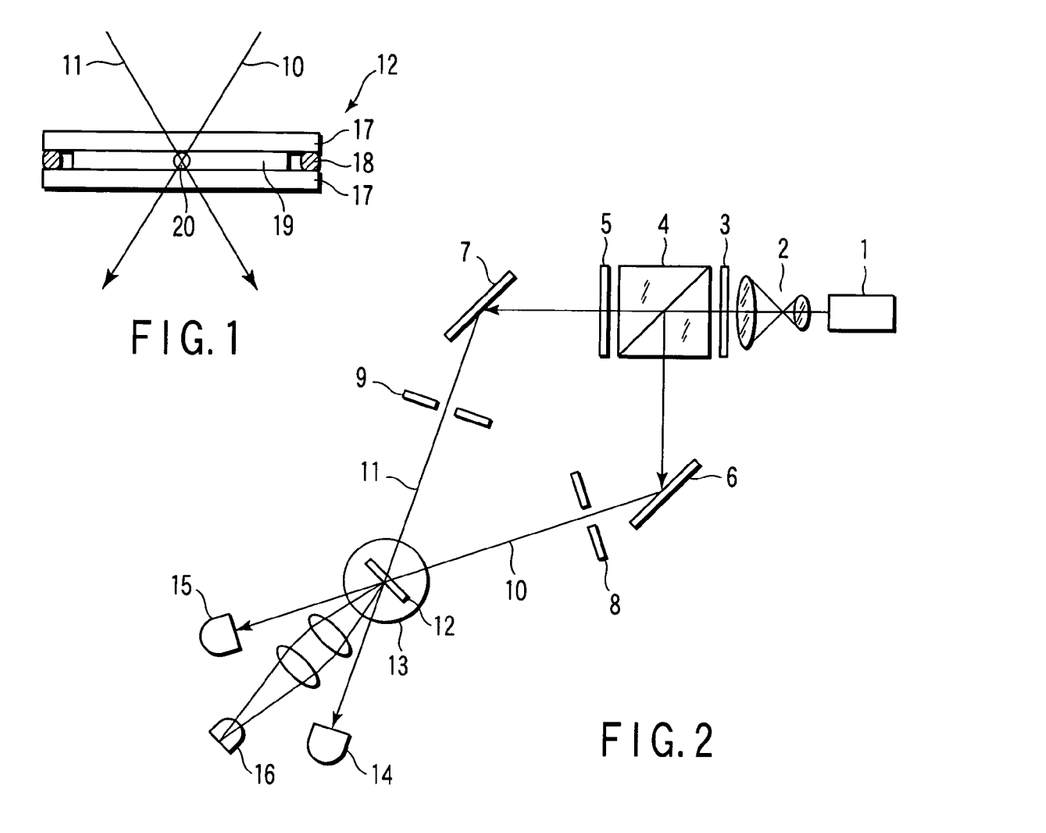
FIG. 1 is a cross sectional view schematically showing the construction of a holographic optical recording medium according to an embodiment of the present invention.
FIG. 2 schematically shows the construction of a holographic information recording-readout apparatus.

In the holographic optical recording medium according to the embodiment of the present invention, the recording is performed as shown in, for example, FIG. 1. To be more specific, FIG. 1 schematically shows a holographic optical recording medium 12 used in the two light flux interference holography and also shows the information light and the reference light in the vicinity of the holographic optical recording medium. The holographic optical recording medium 12 shown in FIG. 1 comprises a pair of transparent substrates 17 each made of glass or a plastic material such as polycarbonate. As shown in the drawing, a spacer 18 and a recording layer 19 are held between the two transparent substrates 17. The recording layer 19 contains a specified polymer matrix three dimensionally cross-linked, a radically polymerizable compound, and a photo radical polymerization initiator.

The holographic optical recording medium 12 of the construction shown in FIG. 1 is irradiated with an information light 10 and a reference light 11. These light beams 10 and 11 are made to cross each other in the recording layer 19 as shown in the drawing, with the result that a transmission type hologram is formed by the interference in a modulating region 20.

FIG. 2 schematically exemplifies a holographic optical recording-readout apparatus. The recording-readout apparatus shown in the drawing is a holographic optical information recording-readout apparatus utilizing the transmission type two light flux interference method.

The light beam emitted from a light source device 1 is introduced into a polarized beam splitter 4 through a beam expander 2 and a wave plate 3. A light source that emits a light capable of interference in the recording layer 19 of the holographic optical recording medium 12 can be used as the light source device 1. However, it is desirable to use as the light source device 1 a linearly polarized laser in view of its capability of interference. The laser noted above includes, for example, a semiconductor laser, an He—Ne laser, an argon laser and a YAG laser.

The beam expander 2 serves to expand the light beam emitted from the light source device 1 so as to permit the expanded light beam to have a diameter adapted for holographic optical recording. The light beam expanded by the beam expander 2 is subjected to a rotary polarization in the wave plate 3 so as to generate a light beam having an S-polarized light component and a P-polarized light component. It is possible for the wave plate 3 to be formed of, for example, a ½ wavelength plate or a ¼ wavelength plate.

The S-polarized light component of the light beam transmitted through the wave plate 3 is reflected by the polarizing beam splitter 4 so as to form the information light 10. On the other hand, the P-polarized light component of the light beam transmitted through the wave plate 3 is transmitted through the polarizing beam splitter 4 so as to form the reference light 11. Incidentally, the direction of the rotary polarization of the light incident at the polarizing beam splitter 4 is controlled by using the wave plate 3 so as to make the information light 10 and the reference light 11 equal to each other in the intensity at the position of the recording layer 19 of the holographic optical recording medium 12.

The information light 10 reflected by the polarizing beam splitter 4 is reflected by a mirror 6 so as to permit the information light 10 to pass through an electromagnetic shutter 8 and, then, the recording layer 19 of the holographic optical recording medium 12 held on a rotary stage 13 is irradiated with the reflected information light 10.

On the other hand, the polarizing direction of the reference light 11 passing through the polarizing beam splitter 4 is rotated by 90° by a wave plate 5 so as to form an S-polarized light. The S-polarized light thus formed is reflected by a mirror 7 and, then, passes through an electromagnetic shutter 9 as the reference light 11. Further, the holographic optical recording medium 12 is irradiated with the S-polarized light (reference light 11) such that the S-polarized light crosses the information light 10 within the recording layer 19 of the holographic optical recording medium 12 held on the rotary stage 13 so as to form a transmission type hologram as a refractive index modulating region 20.

For readout the information thus recorded, the information light 10 is intercepted by closing the electromagnetic shutter 8 so as to allow the transmission type hologram (refractive index modulating layer 20) formed inside the recording layer 19 of the holographic optical recording medium 12 to be irradiated with the reference light 11 alone. When passing through the holographic optical recording medium 12, the reference light 11 is diffracted by the transmission type hologram and the diffracted light is detected by a photo detector 15.

In order to polymerize the unreacted radically polymerizable compound after completion of the holographic optical recording for stabilizing the recorded hologram, it is possible to arrange an ultraviolet light source device 16 and an optical system for irradiation of the ultraviolet light as shown in the drawing. It is possible to use an optional light source that emits light capable of polymerizing the unreacted radically polymerizable compound as the ultraviolet light source device 16. It is possible for the ultraviolet light source device 16 to be formed of, for example, a xenon lamp, a mercury lamp, a high pressure mercury lamp, a mercury xenon lamp, a gallium nitride series light emitting diode, a gallium nitride series semiconductor laser, an excimer laser, a tertiary higher harmonic wave component (355 nm) of a Nd:YAG laser, or a quaternary higher harmonic wave component (266 nm) of a Nd:YAG laser in view of the high emission efficiency of the ultraviolet light.

The holographic optical recording medium according to the embodiment of the present invention can be suitably used for the multi-layer optical information recording-readout. It is possible for the multi-layer optical information recording-readout to be of any of the transmission type and the reflection type.

The present invention will now be described more in detail with reference Examples of the present invention.

EXAMPLE 1

In the first step, a solution of the precursor of the polymer matrix was obtained by mixing 15.1 g of 1,6-hexanediol diglycidyl ether (epoxy equivalent of 151, manufactured by Nagase ChemteX Corporation), which was used as a diglycidyl ether, and 3.38 g of diethylenetriamine used as an amine. On the other hand, a monomer solution was obtained by mixing 1.546 g of N-vinylcarbazole used as a radically polymerizable compound, 0.891 g of N-vinylpyrrolidone used as another radically polymerizable compound, 0.056 g of Irgacure 784 manufactured by Ciba Specialty Chemicals and used a photo radical polymerization initiator, and 0.011 g of Perbutyl H manufactured by NOF Corporation and used as a radical polymerization initiator.

A solution of the precursor of the recording layer was obtained by mixing 8 g of the solution of the precursor of the polymer matrix noted above with 2 g of the monomer solution noted above, followed by defoaming the mixed solution. The solution of the precursor of the recording layer thus obtained was poured into a clearance between two glass plates arranged to face each other with a spacer made of Teflon (registered trade mark) interposed therebetween. The resultant structure was stored for 24 hours at room temperature (25° C.) under a light-shielded state so as to obtain a test piece of a holographic optical recording medium including a recording layer having a thickness of 200 µm.

The precursor of the polymer matrix was cured at room temperature and three dimensionally cross-linked, with the result that the entire recording layer was solidified. The test piece was mounted to the rotary stage 13 of the holographic optical recording apparatus shown in FIG. 2 so as to record a hologram. A semiconductor laser (405 nm) was used as the light source device 1. The size of the light spot on the test piece was 5 mmφ for each of the information light 10 and the reference light 11, and the intensity of the recording light including the information light and the reference light was controlled at 5 mW/cm$^2$.

After the holographic optical recording, the information light 10 was intercepted by closing the electromagnetic shutter 8 so as to permit the holographic optical recording medium 12 to be irradiated with the reference light 11 alone. As a result, a diffracted light from the test piece was recognized so as to confirm that a transmission type hologram was recorded. After irradiation with a light beam having a dose of 100 mJ/cm$^2$, the saturation was achieved at a diffraction efficiency of 85%.

The recording performance of the hologram was evaluated by M/# (M number) representing the recording dynamic range. The M number M/# is defined by the formula given below by using $\eta_i$, wherein $\eta_i$ represents the diffraction efficiency from the i-th hologram in the case where the hologram of n-pages is subjected to an angular multiplexing recording and readout until the recording in the same region within the recording layer of the holographic optical recording medium is rendered impossible:

$$M/\# = \sum_{i=1}^{n} \sqrt{\eta_i}$$

Incidentally, used as the diffraction efficiency η was the internal diffraction efficiency represented by $\eta=I_d/(I_t+I_d)$, where $I_t$ denotes the light intensity detected by the photo detector 14 and $I_d$ denotes the light intensity detected by the photo detector 15 when the holographic optical recording medium 12 is irradiated with the reference light 11 alone.

The holographic optical recording medium having a large value of M/# has a large recording dynamic range and is excellent in the multiplexing recording performance.

Figure 3:
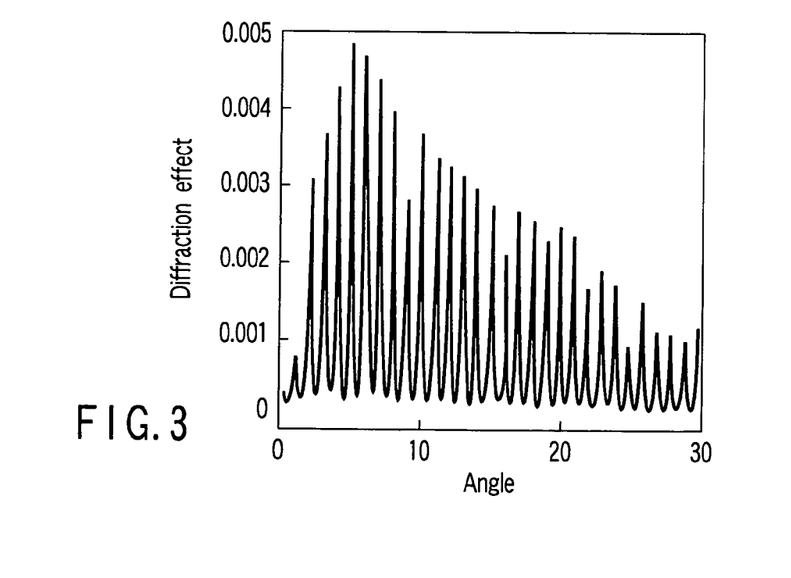
FIG. 3 is a graph exemplifying a holographic angular multiplexing readout signal according to one embodiment of the present invention.

FIG. 3 exemplifies the readout signal in the case of carrying out the angular multiplexing recording and readout. Incidentally, it is possible to calculate the rate of change in the volume (volume shrinking rate) of the holographic optical recording layer 19 before and after the holographic optical recording on the basis of the shift amount of the angle of the peak of the diffraction efficiency from each hologram.

In this Example, an angular multiplexing recording of a hologram of 30 pages was performed by rotating the test piece in a manner to make a single complete rotation by using the rotary stage 13 every time a single page is recorded, and by repeating the rotation of the test piece, with the light exposure amount for one page of the hologram set at 1 mJ/cm². Further, the holographic optical recording medium was left to stand for 5 minutes without applying a light irradiation to the holographic optical recording medium in order to await the completion of the reaction, followed by measuring the diffraction efficiency η while sweeping the rotary stage so as to obtain the value of M/# and the volume shrinking rate.

The value of M/# of the recording medium was found to be 2.4, and the volume shrinking rate caused by the recording was found to be 0.25%.

EXAMPLE 2

A solution of the precursor of the recording layer was prepared as in Example 1, except that the mixing amount of the solution of the precursor of the polymer matrix was changed to 9 g, and the mixing amount of the monomer solution was changed to 1 g. Then, a test piece of the holographic optical recording medium was prepared by the method similar to that in Example 1 by using the solution of the precursor of the recording layer thus prepared.

The precursor of the polymer matrix was cured at room temperature and three dimensionally cross-linked, with the result that the entire recording layer was solidified. The test piece thus prepared was irradiated with the information light and the reference light under the conditions similar to those in Example 1 so as to record a transmission type hologram. After irradiation with a light beam having a dose of 160 mJ/cm², saturation was achieved with a diffraction efficiency of 91%.

Further, the value of M/# and the volume shrinking rate were obtained by subjecting a hologram of 30 pages to an angular multiplexing recording and readout with the light exposure amount per page set at 1 mJ/cm² as in Example 1.

The value of M/# of the recording medium was found to be 1.8, and the volume shrinking rate caused by the recording was found to be 0.16%.

EXAMPLE 3

In the first step, a solution of the precursor of the polymer matrix was prepared by mixing 7.32 g of diethylene glycol diglycidyl ether having an epoxy equivalent of 122, which was manufactured by Nagase ChemteX Corporation and used as a diglycidyl ether, with 2.16 g of diethylenetriamine used as an amine. A solution of the precursor of the recording layer was prepared as in Example 1, except that used was the solution of the precursor of the polymer matrix thus prepared. Then, a test piece of the holographic optical recording medium was manufactured as in Example 1.

The precursor of the polymer matrix was cured at room temperature and three dimensionally cross-linked, with the result that the entire recording layer was solidified. The test piece thus prepared was irradiated with the information light and the reference light under the conditions similar to those in Example 1 so as to record a transmission type hologram. After irradiation with a light beam having a dose of 180 mJ/cm², saturation was achieved with a diffraction efficiency of 90%.

Further, the value of M/# and the volume shrinking rate were obtained by subjecting a hologram of 30 pages to an angular multiplexing recording and readout with the light exposure amount per page set at 1 mJ/cm² as in Example 1.

The value of M/# of the recording medium was found to be 2.0, and the volume shrinking rate caused by the recording was found to be 0.21%.

EXAMPLE 4

A hologram was recorded in the test piece manufactured in Example 1 by changing the light source device 1 into a secondary higher harmonic wave component (532 nm) of a Nd:YAG laser. The size of the beam spot on the test piece was 5 mmφ in each of the information light 10 and the reference light 11, and the intensity of the recording light including the information light and the reference light was controlled at 5 mW/cm².

After the holographic optical recording, the information light 10 was intercepted by closing the electromagnetic shutter 8 so as to permit the holographic optical recording medium 12 to be irradiated with the reference light 11 alone. As a result, a diffracted light from the test piece was recognized so as to confirm that a transmission type hologram was recorded. After irradiation with a light beam having a dose of 200 mJ/cm², saturation was achieved with a diffraction efficiency of 88%.

EXAMPLE 5

A solution of the precursor of the recording layer was prepared as in Example 1, except that 4.25 g of triethylenetetraamine was used as an amine, and a test piece of the holographic optical recording medium was manufactured as in Example 1 by using the solution thus prepared. The test piece was irradiated with the information light and the reference light under the conditions similar to those in Example 1, with the result that a transmission type hologram was recorded. After irradiation with a light beam having a dose of 75 mJ/cm², saturation was achieved with a diffraction efficiency of 76%.

EXAMPLE 6

A solution of the precursor of the recording layer was prepared as in Example 1, except that 4.73 g of tetraethylenepentaamine was used as an amine, and a test piece of the holographic optical recording medium was manufactured as in Example 1 by using the solution thus prepared. The test piece was irradiated with the information light and the reference light under the conditions similar to those in Example 1, with the result that a transmission type hologram was recorded. After irradiation with a light beam having a dose of 105 mJ/cm², saturation was achieved with a diffraction efficiency of 81%.

EXAMPLE 7

A solution of the precursor of the recording layer was prepared as in Example 1, except that 4.59 g of iminobispropylamine was used as an amine, and a test piece of the holographic optical recording medium was manufactured as in Example 1 by using the solution thus prepared. The test piece was irradiated with the information light and the reference light under the conditions similar to those in Example 1, with the result that a transmission type hologram was recorded. After irradiation with a light beam having a dose of 80 mJ/cm², saturation was achieved with a diffraction efficiency of 73%.

EXAMPLE 8

A solution of the precursor of the recording layer was prepared as in Example 1, except that Irgacure 784 used in Example 1 was changed into 0.056 g of Irgacure 819 manufactured by Ciba Specialty Chemicals, and a test piece of the holographic optical recording medium was manufactured as in Example 1 by using the solution thus prepared. The test piece was irradiated with the information light and the reference light under the conditions similar to those in Example 1, with the result that a transmission type hologram was recorded. After irradiation with a light beam having a dose of 200 mJ/cm$^2$, saturation was achieved with a diffraction efficiency of 82%.

EXAMPLE 9

A monomer solution was prepared by mixing 1.5 g of 4-bromostyrene used as a radically polymerizable compound, 0.035 g of Irgacure 784 manufactured by Ciba Specialty Chemicals and used as a photo radical polymerization initiator, and 0.007 g of Perbutyl H manufactured by NOF Corporation. Then, a solution of the precursor of the recording layer was prepared as in Example 2, except that used was the monomer solution thus prepared. Further, a test piece of the holographic optical recording medium was manufactured by the method similar to that for Example 2.

The test piece was irradiated with the information light and the reference light under the conditions similar to those in Example 1, with the result that a transmission type hologram was recorded. After irradiation with a light beam having a dose of 80 mJ/cm$^2$, saturation was achieved with a diffraction efficiency of 70%.

EXAMPLE 10

In the first step, a uniform solution was obtained by mixing 7.55 g of 1,6-hexanediol diglycidyl ether (epoxy equivalent of 151, manufactured by Nagase ChemteX Corporation), which was used as a diglycidyl ether, 1.8 g of N-vinylcarbazole, which was used as a radically polymerizable compound, and 0.046 g of Irgacure 784 (manufactured by Ciba Specialty Chemicals) used as a photo radical polymerization initiator. Further, 1.8 g of diethylenetriamine was added to the uniform solution and 0.01 g of Perbutyl H (manufactured by NOF Corporation) was added finally to the uniform solution so as to prepare a solution of the precursor of the recording layer.

A test piece of the holographic optical recording medium was manufactured similarly by using the solution of the precursor of the recording layer thus prepared, and the test piece thus manufactured was irradiated with the information light and the reference light under the conditions similar to those for Example 1, with the result that recorded was a transmission type hologram. After irradiation with a light beam having a dose of 190 mJ/cm$^2$, saturation was achieved with a diffraction efficiency of 92%.

Incidentally, it has been confirmed from the analysis by FT-IR, FT-Raman, NMR, GC-MAS, and the element analysis that the three dimensionally cross-linked polymer matrix in the recording layer in each of Examples 1, 2 and 4 to 10 has the structure represented by chemical formula (1) and that the three dimensionally cross-linked polymer matrix in the recording layer in Example 3 has the structure represented by chemical formula (2).

COMPARATIVE EXAMPLE 1

A solution of the precursor of the recording layer was prepared as in Example 1, except that 10.1 g of 1,4-butanediol diglycidyl ether (purchased from Wako Pure Chemical Industries, Ltd.) was used as a diglycidyl ether.

Then, a test piece of the holographic optical recording medium was manufactured similarly by using the solution thus prepared. The test piece was irradiated with the information light and the reference light under the conditions similar to those in Example 1, with the result that a transmission type hologram was recorded. After irradiation with a light beam having a dose of 190 mJ/cm$^2$, saturation was achieved with a diffraction efficiency of 62%.

COMPARATIVE EXAMPLE 2

A solution of the precursor of the recording layer was prepared as in Example 1, except that polypropylene glycol diglycidyl ether (epoxy equivalent of 176, manufactured by Nagase ChemteX Corporation) was used as diglycidyl ether.

It was attempted to manufacture a test piece of the holographic optical recording medium by the method similar to that in Example 1 by using the solution thus prepared. However, since the recording layer was in a semi-solidified state 24 hours later, a test piece of the holographic optical recording medium was manufactured by extending the storage time to 48 hours. When the test piece thus manufactured was irradiated with the information light and the reference light under the conditions equal to those in Example 1, a transmission type hologram was recorded. After irradiation with a light beam having a dose of 90 mJ/cm$^2$, saturation was achieved with a diffraction efficiency of 38%.

Further, the value of M/# and the volume shrinking rate were obtained by subjecting a hologram of 30 pages to an angular multiplexing recording and readout with the light exposure amount per page set at 1 mJ/cm$^2$. As a result, the value of M/# of the recording medium was found to be 1.5, and the volume shrinking rate caused by the recording was found to be 0.40%.

COMPARATIVE EXAMPLE 3

A solution of the precursor of the recording layer was prepared as in Example 1, except that 10.8 g of neopentyl glycol diglycidyl ether purchased from Tokyo Kasei Kogyo Co., Ltd. was used as a diglycidyl ether.

A test piece of the holographic optical recording medium was prepared as in Comparative Example 2 by using the solution thus prepared. When the test piece thus prepared was irradiated with the information light and the reference light under the conditions similar to those for Example 1, a transmission type hologram was recorded. After irradiation with a light beam having a dose of 80 mJ/cm$^2$, saturation was achieved with a diffraction efficiency of 17%.

COMPARATIVE EXAMPLE 4

A solution of the precursor of the recording layer was prepared as in Example 1, except that 18.7 g of polyethylene glycol diglycidyl ether (epoxy equivalent of 187, manufactured by Nagase ChemteX Corporation) was used as a diglycidyl ether.

A test piece of the holographic optical recording medium was prepared as in Comparative Example 2 by using the solution thus prepared. When the test piece thus prepared was irradiated with the information light and the reference light under the conditions similar to those for Example 1, a transmission type hologram was recorded. After irradiation with a light beam having a dose of 120 mJ/cm$^2$, saturation was achieved with a diffraction efficiency of 18%.

COMPARATIVE EXAMPLE 5

A solution of the precursor of the recording layer was prepared as in Example 1, except that 7.1 g of 1,2,7,8-diepoxyoctane purchased from Wako Pure Chemical Industries, Ltd. was used in place of the diglycidyl ether.

A test piece of the holographic optical recording medium was prepared as in Comparative Example 2 by using the solution thus prepared. When the test piece thus prepared was irradiated with the information light and the reference light under the conditions similar to those for Example 1, a transmission type hologram was recorded. Even where the holographic optical recording medium was irradiated with a light beam of 1500 mJ/cm$^2$, the maximum value of the diffraction efficiency was 8%.

As apparent from the experimental data given above, it is possible to obtain a holographic optical recording medium having a diffraction efficiency of 70% or more in the case of using 1,6-hexanediol diglycidyl ether or diethylene glycol diglycidyl ether as the diglycidyl ether and in the case of using a cured material of the reaction product between the particular diglycidyl ether and an amine. Also, the value of M/# is not smaller than 1.8, and the maximum volume shrinking rate does not exceed 0.25%.

In the case of using a diglycidyl ether other than 1,6-hexanediol diglycidyl ether or diethylene glycol diglycidyl ether, the highest diffraction efficiency is 62% at most. In addition, the value of M/# is 1.5, and the volume shrinking rate is increased to 0.40% as apparent from the experimental data for the cases of the Comparative Examples. Also, in the case of using a compound other than the diglycidyl ether, e.g., in the case of using diepoxy octane, the diffraction efficiency was only 8% even if the dose of the light irradiation was increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A holographic optical recording medium, comprising:
  a recording layer containing a three dimensionally cross-linked polymer matrix, a radically polymerizable compound, and a photo radical polymerization initiator, the three dimensionally cross-linked polymer matrix comprising a cured material of a reaction product between a diglycidyl ether and an amine, the diglycidyl ether being selected from the group consisting of 1,6-hexanediol diglycidyl ether and diethylene glycol diglycidyl ether wherein the holographic optical recording medium has a maximum volume shrinking rate not exceeding 0.25% after angular multiplex recording.

2. The holographic optical recording medium according to claim 1, wherein the amine is an aliphatic primary amine.

3. The holographic optical recording medium according to claim 2, wherein the aliphatic primary amine is at least one selected from the group consisting of diethylenetriamine, triethylenetetraamine, tetraethylenepentaamine, pentaethylenehexaamine and iminobispropylamine.

4. The holographic optical recording medium according to claim 1, wherein the amine is mixed in an amount that the amount of NH— of the amine is 0.6 to 2 times as large as the equivalent of oxirane of the diglycidyl ether.

5. The holographic optical recording medium according to claim 1, wherein the radically polymerizable compound is selected from the group consisting of an unsaturated carboxylic acid, an unsaturated carboxylic acid ester, an unsaturated carboxylic acid amide and a vinyl compound.

6. The holographic optical recording medium according to claim 1, wherein the radically polymerizable compound is mixed in an amount of 1 to 50% by weight based on the weight of the entire recording layer.

7. The holographic optical recording medium according to claim 1, wherein the photo radical polymerization initiator is selected from the group consisting of an imidazole derivative, an organic azide compound, titanocenes, an organic peroxide, and a thioxanthone derivative.

8. The holographic optical recording medium according to claim 1, wherein the photo radical polymerization initiator is mixed in an amount of 0.1 to 10% by weight based on the amount of the radically polymerizable compound.

9. The holographic optical recording medium according to claim 1, wherein the recording layer further comprises at least one selected from the group consisting of cyanine, merocyanine, xanthene, coumarin, eosine, a silane coupling agent and a plasticizer.

10. The holographic optical recording medium according to claim 1, wherein the thickness of the recording layer falls within a range of between 20 μm and 2 mm.

11. The holographic optical recording medium according to claim 1, further comprising a pair of transparent substrates having the recording layer sandwiched therebetween.

12. The holographic optical recording medium according to claim 1, wherein the cured material of the reaction product between the diglycidyl ether and the amine has a structure represented by chemical formula (1) or (2) given below:

-continued

13. A holographic optical recording medium, comprising a recording layer including a three dimensionally cross-linked polymer matrix, a radically polymerizable compound, and a photo radical polymerization initiator, the three dimensionally cross-linked polymer matrix having a chemical structure represented by formula (1) or (2) given below:

wherein the holographic optical recording medium has maximum volume shrinking rate not exceeding 0.25% after angular multiplex recording.

14. The holographic optical recording medium according to claim 13, wherein the radically polymerizable compound is selected from the group consisting of an unsaturated carboxylic acid, an unsaturated carboxylic acid ester, an unsaturated carboxylic acid amide and a vinyl compound.

15. The holographic optical recording medium according to claim 13, wherein the radically polymerizable compound is mixed in an amount of 1 to 50% by weight based on the amount of the entire recording layer.

16. The holographic optical recording medium according to claim 13, wherein the photo radical polymerization initiator is selected from the group consisting of an imidazole derivative, an organic azide compound, titanocenes, an organic peroxide, and a thioxanthone derivative.

17. The holographic optical recording medium according to claim 13, wherein the photo radical polymerization initiator is mixed in an amount of 0.1 to 10% by weight based on the amount of the radically polymerizable compound.

18. The holographic optical recording medium according to claim 13, wherein the recording layer further comprises at least one selected from the group consisting of cyanine, merocyanine, xanthene, coumarin, eosine, a silane coupling agent and a plasticizer.

19. The holographic optical recording medium according to claim 13, wherein the thickness of the recording layer falls within a range of between 20 μm and 2 mm.

20. The holographic optical recording medium according to claim 13, further comprising a pair of transparent substrates having the recording layer sandwiched therebetween.

* * * * *

UNITED STATES PATENT AND TRADEMARK OFFICE
CERTIFICATE OF CORRECTION

PATENT NO. : 7,494,747 B2
APPLICATION NO. : 10/986059
DATED : February 24, 2009
INVENTOR(S) : Hayase et al.

Page 1 of 1

It is certified that error appears in the above-identified patent and that said Letters Patent is hereby corrected as shown below:

Claim 1, column 13, line 48, change "ether wherein" to --ether, wherein--.

Claim 1, column 14, line 3, change "multiplex" to --multiplexing--.

Claim 13, column 15, lines 39-40, change "has maximum" to --has a maximum--.

Claim 13, column 15, line 41, change "multiplex" to --multiplexing--.

Signed and Sealed this

Twelfth Day of May, 2009

JOHN DOLL
*Acting Director of the United States Patent and Trademark Office*